United States Patent

[11] 3,611,827

[72] Inventors Robert O. Bottum;
Kirk W. Reimers, both of Lincoln, Nebr.
[21] Appl. No. 859,254
[22] Filed Sept. 19, 1969
[45] Patented Oct. 12, 1971
[73] Assignee Outboard Marine Corporation
Waukegan, Ill.
Continuation-in-part of application Ser. No. 821,214, May 2, 1969, now abandoned.

[54] FORCE LIMITED COUPLING
4 Claims, 4 Drawing Figs.

[52] U.S. Cl. .................................................. 74/471,
60/53 R, 74/471 XY, 74/582, 91/413, 180/6.48
[51] Int. Cl. ........................................................ G05g 9/00
[50] Field of Search ........................................... 74/582, 471
XY, 471, 524; 180/6.48, 6.3; 60/53, 52 USP;
91/413

[56] References Cited
UNITED STATES PATENTS
1,304,955  5/1919  Fowler .......................... 74/582 X
2,037,407  4/1936  Cremer ......................... 74/582 X
2,625,838  1/1953  Dillard .......................... 74/582
2,896,411  7/1959  Bowers et al. ................. 60/52 USP
3,198,301  8/1965  Randall ......................... 74/582
3,323,607  6/1967  Futamata ...................... 74/471 X
FOREIGN PATENTS
1,322,845  2/1963  France .......................... 180/6.48

Primary Examiner—William F. O'Dea
Assistant Examiner—F. D. Shoemaker
Attorneys—Robert E. Clemency, John W. Michael, Gerrit D. Foster, Bayard H. Michael, Robert K. Gerling, Paul R. Puerner, Joseph A. Gemignani, Andrew O. Riteris and Spencer B. Michael ABSTRACT: Disclosed herein is a hydrostatic drive unit controlled by a spring-loaded device which serves, in effect, as a mechanical safety valve preventing or limiting the buildup of undesirable or excessive pressure in the hydrostatic unit. Also disclosed herein is such a control device comprising a force-limiting coupling which connects the ends of a pair of parallel links or rods. When an axial force exerted in either direction on one of the links attains a predetermined force value, a spring yieldably affords overtravel or relative movement of one of the control links with respect to the other to prevent transmission of excessive forces.

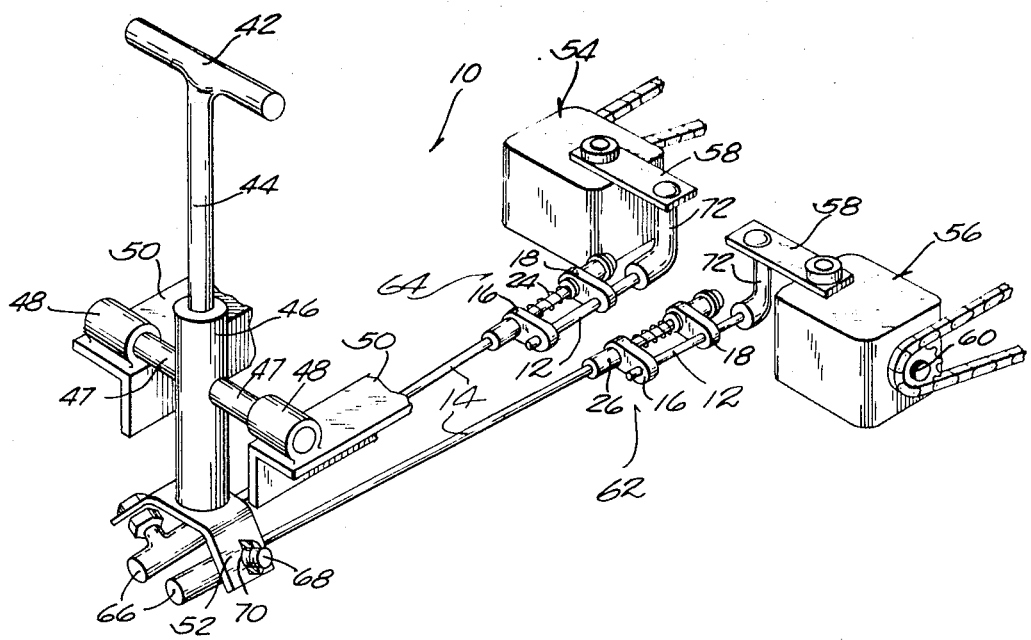
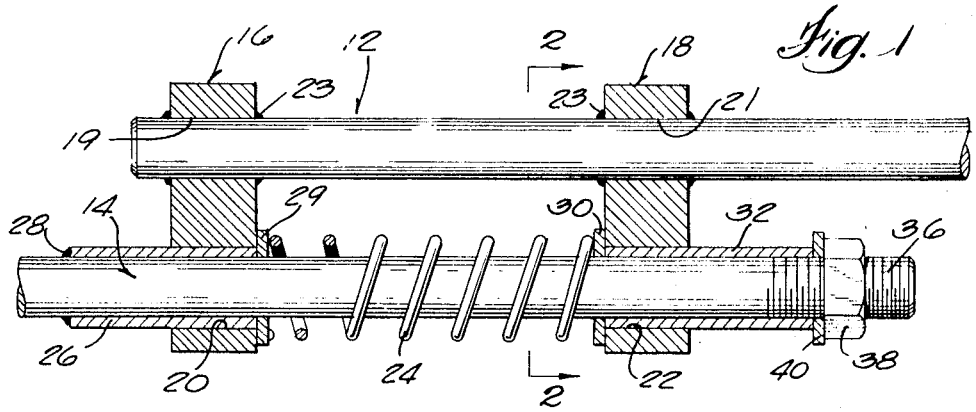
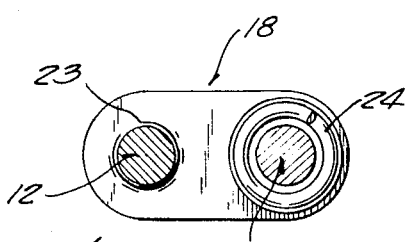

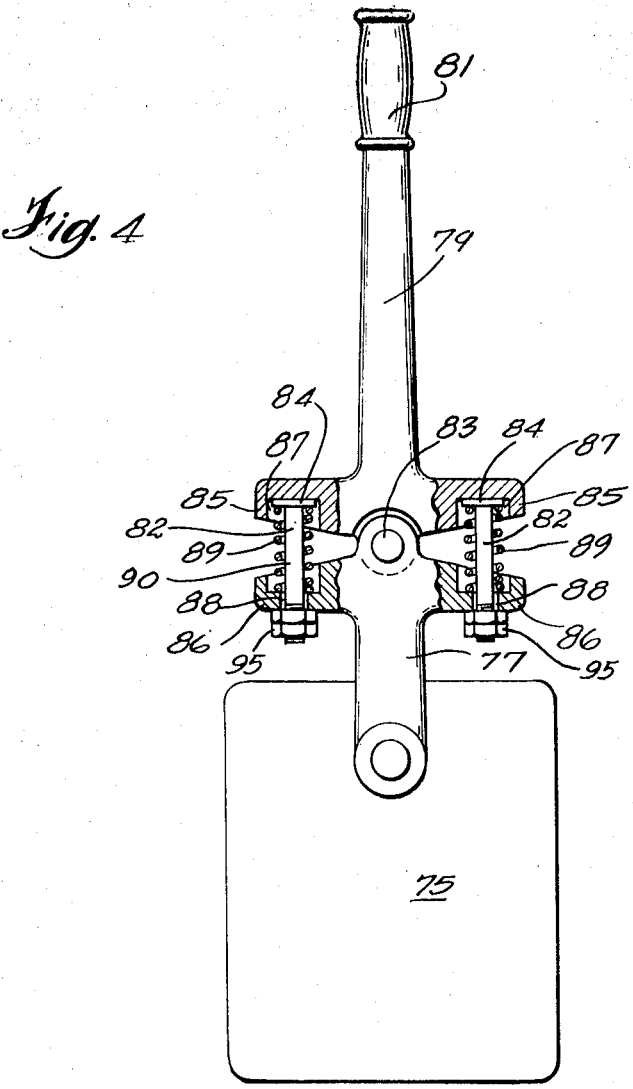

FORCE LIMITED COUPLING

This application is a continuation-in-part of our earlier application Ser. No. 821,214 filed May 2, 1969 now abandoned.

BACKGROUND OF THE INVENTION

The invention relates to controls for hydraulic or hydrostatic drive units which develop internal pressures in accordance with the load experienced by the output shaft. In operation and in response to the encountering of a greater load, the pressure builds up within the hydrostatic unit and can tend to return the swash plate toward neutral. Thus, as the load builds up, the operator must apply a proportional counterforce to meet the increased load in an attempt to retain the output speed setting of the hydrostatic unit or at least to retain sufficient output from the hydrostatic unit to maintain some output speed. Under such circumstances, if the operator or user applies increasing force to the control to meet an increasing load experienced by the hydrostatic unit, the result can be a buildup of hydraulic pressure within the hydrostatic unit to excessive levels which can cause damage or excessive wear to the hydrostatic unit.

In order to alleviate this situation, various hydrostatic transmissions have, in the past, included pressure relief valves which are expensive and have operating deficiencies, such as seal problems. In addition, when such safety valves operate, the oil is heated providing an energy loss and a temperature problem.

In addition, the invention also relates to couplings for connecting two parallel links or push rods which transmit linear forces.

SUMMARY OF THE INVENTION

It is an object of the invention to provide a force-limiting mechanical coupling or connection which is provided between a hydrostatic transmission and the transmission control member and which protects the transmission from overload and eliminates the need for a pressure relief valve in the transmission.

The invention provides a control for a hydrostatic transmission or drive unit, which control affords limitation of the operating or controlling force applied by the operator to the transmission unit, thereby preventing pressure overloading of the transmission unit. Various mechanical arrangements for controlling the hydrostatic unit can be provided which will yield, either instantaneously or gradually, so at to prevent excessive loading of the hydrostatic drive unit.

It is a further object of the invention to provide a coupling for connecting parallel shafts or links, which coupling limits the transmission of forces.

The invention also provides a coupling for the previously mentioned hydrostatic unit control, or for other uses, which coupling limits the transmission of forces from one link to another to a predetermined, safe value to minimize damage to the controlled unit. When the loading forces on one coupling member exceed the predetermined force level, a spring yieldably affords overtravel or relative movement of one of the coupling members with respect to the other.

More specifically in one disclosed construction, the coupling connects two parallel links or rods and includes a compression spring located between two washers carried by one of the control rods. The washers are located interiorly of fixed guides or abutments carried by the other control rod. The first mentioned control rod extends through the washers and spring and is movable in coaxial apertures in the two guides. When forces are exerted on the first-mentioned control rod, one of the washers bears against the spring to transmit force to the opposite guide and thus the other control rod. When the predetermined force level is attained, the spring compresses and permits overtravel of the first-mentioned control rod through the apertures in the guides.

Further objects and advantages of the invention will become apparent from the following description and accompanying drawings.

DESCRIPTION OF THE DRAWINGS

FIG. 1 is a fragmentary sectional view of a coupling in accordance with the invention.

FIG. 2 is a sectional view taken along the line 2—2 of FIG. 1.

FIG. 3 is a fragmentary perspective view of the two control rod assemblies of the invention in use in a speed and steering control for the vehicle.

FIG. 4 is an elevational view of a hydrostatic transmission unit connected to a control in accordance with the invention.

DETAILED DESCRIPTION

Shown in FIG. 3 are a pair of hydrostatic transmission units 54 and 56 which are arranged to drive a vehicle through output shafts 60 adapted to be connected to the wheels or the tracks of a vehicle. Each of the transmissions 54 and 56 includes an actuating member which can be displaced in either direction from a neutral operating position to respectively provide forward and rearward operation at speeds which increase with increasing displacement from the neutral position. One form of such hydrostatic unit, shown in the disclosed constructions, includes an actuating member in the form of an interior swash or wobble plate (not shown) connected to a swash plate or transmission lever or member 58 operable to vary the location of the swash plate. Each of the swash plate or transmission levers 58 is connected to a control member 42 by means affording coordinated speed and direction control of the output shafts 60. Various arrangements can be employed to obtain coordinated speed and direction control. When the hydrostatic units experience excessive loading, said means also functions to limit the forces applied to the transmission levers 58 and thereby to the swash plates by affording lost motion in the control linkage, thereby acting in the nature of a safety valve to prevent the buildup of excessive hydraulic pressures within the hydrostatic unit. Various arrangements can be utilized to provide lost motion in the control incident to development of predetermined pressure in the hydrostatic unit.

In the arrangement shown in FIGS. 1 through 3, the control member 42 comprises a handle or short cross-shaft at the top, a vertical post or control stick 44 which is rotatably supported for movement about a vertical axis in a sleeve 46. The sleeve 46 and control stick 44 are rotatably supported for tilting movement about a horizontal axis by opposed trunnions 47 which are journaled in pillow blocks 48 carried by a frame 50. At its bottom, the control stick 44 is connected to a bracket 52.

As already indicated, the control member 42 can be connected to the hydrostatic unit to prevent excessive pressure buildup in the hydrostatic unit by various arrangements affording lost motion in response to the input of force, either from the operator or from the controlled hydrostatic unit, above a predetermined level. In the construction disclosed in FIGS. 1 through 3, such means is in the form of a pair of control rod or link assemblies 62 and 64 which are respectively connected to the swash plate levers 58 by L-shaped couplings 72 and to the bracket 52 by "T" shaped couplings 66 having threaded portions 68 which extends through apertures 70 in the bracket 52.

Each of the control rod assemblies 62 and 64 includes a coupling 10 which connects first and second control rod portions or links 12 and 14. Each coupling 10 includes a pair of guides or abutments 16 and 18 including apertures 19 and 21 receiving the control rod portion 12. The guides 16 and 18 are also each provided with an aperture 20 and 22 and are secured in spaced relationship to the control rod portion 12 by welds 23 such that the apertures 20 and 22 are aligned in coaxial relation to receive the second control rod portion 14.

In accordance with the invention, means are provided which cooperate with the guides for affording relative movement or overtravel of one of the control rod portions with respect to the other of the control rod portions when loading forces exerted on either of the rod portions 12 or 14 exceed a predetermined force magnitude. In the disclosed construction the means includes a preloaded compression spring 24 which is telescoped over or arranged around the rod portion 14 and located between the abutments 16 and 18. The means also includes means on the second rod portion 14 for engaging the spring 24 to transmit loading forces from the second rod to the spring. As disclosed, the means comprises a bushing 26 which extends through the aperture 20 and can be welded at 28 or otherwise secured to rod portion 14. The means also includes two washers 29 and 30 which are carried by the second control rod portion 14 and are located between the ends of the spring 24 and the guides 16, 18.

The invention also includes means for limiting travel in one direction of the rod portion 14. As disclosed, the means includes a bushing 32 which extends through aperture 22 and engages the washer 30. The means also includes a threaded portion 36 on the end of the second rod portion 14 and a nut 38 which bears against the end 40 of bushing 32. The washer 40 and nut 38 prevent the rod portion 14 from being pulled completely through the aperture 22 and also facilitate assembly of the spring 24 and washers 29, 30. Alternatively, the means for limiting travel of the rod portion 14 can be a fixed abutment on the rod portion 14.

In operation of the control apparatus shown in FIG. 3, forward or rearward control member movement about the axis of the trunnions 47 or steering movement of the control member about the axis of the control stick 44 will cause an axial force to be exerted on the control rod assemblies 62 and 64. When the forces on the control rod assemblies exceed a predetermined safe force limit, as for instance when the vehicle is in rough terrain, climbing a hill, or carrying a heavy load, etc., the springs 58 will compress and provide overtravel or relative movement of the first rod portions 12 with respect to the second rod portions 14, as well as movement of the swash plate levers 58 while the control member remains stationary, thus preventing increasing forces applied by the operator from reaching the levers 58 and thereby minimizing the possibility of damage to the transmissions.

More specifically, a pulling force exerted on the coupling 10, as for instance, by clockwise movement of the control member 42 about the trunnions 47, will cause the springs 24 to be urged against guides 16 by the washers 30. When the predetermined force level is exceeded, the springs 24 will yieldably afford overtravel of rods 14 to the left relative to the rods 12 with the bushings 28 sliding through the apertures 20 and the bushings 32 sliding through the apertures 22. A pushing force on control rod portions 14 caused by counterclockwise movement of the control member 42 about the trunnions 47 will cause the springs 24 to be urged against the guides 18 by the bushings 28 and washers 29. When the predetermined force level is exceeded, the rod portions 14 will move to the right relative to the rods 12 and the guides 16 and 18.

While the above arrangement provides a particularly satisfactory control arrangement, various other arrangements can be employed to prevent excessive buildup of pressures in a hydrostatic unit consequent to the application of increasing load on the output of the hydrostatic unit and attempted operator action to meet the load. Such means could employ a yieldable elastomeric or rubber connection or spring, or a pneumatic or hydraulic spring with a compressible fluid and in the form of a cylinder affording lost motion above a predetermined force value.

It should also be noted that the lost motion feature can be provided anywhere in the linkage between the actuating member of the hydrostatic unit and the control member which is grasped by the operator.

It should be further noted that the lost motion action afforded by the spring means is applicable to prevent excessive pressure buildup in a single hydraulic transmission unit independently of an integrated system including more than one such unit.

Thus, there is shown in FIG. 4 a hydrostatic unit 75 having an actuating member with a lever or element 77 which is fixed thereto and moves with the actuating member to either side of a neutral position. The lever 77 has pivotally fixed thereto a control member 79 which has, at the outer end thereof, a control handle 81. Alternatively, the control member 79 could be connected to a linkage having a remote actuator.

Means are provided for obtaining lost motion between the lever 77 and the control member 79 or handle 81 when the hydraulic unit 75 experiences an excessive load so as to prevent the operator from applying sufficient force to meet the lead and thereby cause excessive buildup of pressure within the hydrostatic unit. In the construction disclosed in FIG. 4, such means includes a connection 83 which joins the control member 79 and the transmission member lever 77 and which affords pivotal movement which can be "lost" between the lever 77 and the control member 79 or handle 81. In addition, such means also includes spring means operating between the handle 81 or control member 79 and the lever 77, which spring means accommodates lost angular movement or motion when the force applied by the operator through the control member 79 to rock the lever 77 exceeds a predetermined level or magnitude, thereby avoiding excessive pressure buildup in the hydrostatic unit.

While various spring means can be employed, in the construction shown in FIG. 4, each of the control member 79 and transmission lever 77 include respective oppositely extending wings or ears 85 and 86 with the wings 85 of the control member 79 facing the wings 86 of the transmission lever 77. Each wing 85 is suitably recessed as at 87 to respectively receive the ends of a pair of preloaded helical compression springs 89 and to thereby retain the springs in proper operating position. In addition, the recesses 87 in the wings 86 communicate with bores 88, for purposes still to be described.

More particularly, means are provided for preloading each of the spring 89. Various arrangements can be employed. In the disclosed construction, such means is in the form of T-shaped members 82 each having a head 84 and a stem 90. The heads 84 can be received in the recesses 87 of the wings 85 for guidance purposes and are engaged with both the top of the springs 89 and, when the control member and lever are in neutral position, with the base of the recesses 87 in the wings 85. The stems 90 extend through the springs 89 and through the bores 88 to below the wings 86. The lower ends of the stems 90 are threaded and locknuts 95 are employed on the threaded stems below the wings 86, thereby to both preload the springs and to locate the heads 84 in proper position relative to the wings 85 so that when the applied forces are below the preload of the springs 89, the control member 77 and the lever 79 will act in unison. However, when the forces applied between the member 79 and lever 77 exceed the preload on the springs 89, relative movement will occur between the lever 77 and the member 79 so as to avoid excessive buildup of pressure in the connected associated hydrostatic unit.

In operation, movement of the handle 81 or control member 79 to the left or right will cause corresponding movement of the transmission lever 77. However, when the force applied to the handle 81 or control member 79 is increased above a predetermined value in order to meet an increasing load, lost angular movement will occur to prevent further increased application of force to the transmission lever 77 from the control member 79 and thereby limit the pressure level in the hydrostatic unit 75. Thus, there is provided an effective mechanical safety valve to prevent excessive pressure in the hydrostatic unit 75.

While both specifically disclosed embodiments include compression springs, the invention extends to various kinds of preloaded spring devices including tension and leaf springs and, as before mentioned, to elastomeric springs and hydraulic and pneumatic springs provided by compressible fluid. In addition, the invention extends to various linkages including rectilinear and angular lost motion connections and linkages whereby to avoid the application of excessive force to a hydrostatic transmission actuating lever or member.

Various of the features of the invention are set forth in the following claims.

I claim:

1. A control system comprising a control member, means for supporting said control member for movement about horizontal and vertical axes, a hydrostatic transmission, said transmission having an operating lever, a first rod operably connected to said operating lever and a second rod operably connected to said control member, and a linkage connecting said first and second rods and including mechanical means interposed between said first and second rods for limiting force transmission from one of said rods to the other of said rods to a predetermined force level.

2. A control system comprising a control member, means for supporting said control member for movement about horizontal and vertical axes, a hydrostatic transmission having an operating lever, a first rod operably connected to said operating lever, a second rod operably connected to said control member, first and second abutments carried by and secured to said first rod, said abutments being spaced longitudinally of said first rod, coaxial apertures in each of said first and second abutments, said apertures receiving said second rod, a spring arranged around said second rod and located between said abutments, and means on said second rod engageable with said spring to compress said spring and thereby to limit force transmission from one of said rods to the other of said rods to a predetermined force level.

3. A drive comprising a hydrostatic transmission including a member movable in opposite directions from a neutral position, a control member, and means connecting said control member and said transmission member and including spring means for affording lost motion between said members upon the attempted transmission of force between said members above a predetermined force magnitude.

4. A drive comprising a hydrostatic transmission including a member movable in opposite directions from a neutral position, a control member, and a mechanical linkage connecting said control member and said transmission member including means for preventing transmission of force therebetween above a predetermined force magnitude.